(12) United States Patent
Phillips

(10) Patent No.: US 6,375,196 B1
(45) Date of Patent: Apr. 23, 2002

(54) SEALING SYSTEM FOR A SCREW CONVEYOR AND DRIVE

(75) Inventor: Allyn E. Phillips, Salem, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/410,124

(22) Filed: Sep. 30, 1999

(51) Int. Cl.[7] .................................................. F16J 15/32
(52) U.S. Cl. ....................... 277/511; 277/551; 277/390; 403/369; 74/606 R
(58) Field of Search .................................. 277/511, 551, 277/390, 394; 403/369, 3, 4; 74/606 R

(56) References Cited

U.S. PATENT DOCUMENTS 5,667,333 A  9/1997  Phillips ....................... 403/369

OTHER PUBLICATIONS

"Installation, Lubrication and Maintenance; 107–407TL Screw Conveyor Drives".
Dorris Torque Drives, Inc.; "Shaft Mount and Screw Conveyor Gear Drive—Introducing 507TR".
Browning Morse, Emerson Power Transmission; "Screw Conveyor Drives Units and Components".
Link–Belt Drives, Model FX Shaft Mounted Speed Reducers Model FC Screw Conveyor Drives.
Link–Belt Drives, Model FX Shaft Mounted Speed Reducers Model FC Screw Conveyor Drives; "Mounting Flexibility, etc.".
Foote–Jones/Illinois Gear; Shaft Mounted and Screw Conveyor Drives.
Dodge Gearing Engineering Catalog.
Falk Drives; "Quadrive 4000J Shaft Mounted Drives with New TA Taper Bushing".
Dodge Bearings.

*Primary Examiner*—Anthony Knight
*Assistant Examiner*—Enoch Peavey
(74) *Attorney, Agent, or Firm*—Ralph A. Graham; Alexander M. Gerasimow; William R. Walbrun

(57) ABSTRACT

A system is provided for sealingly coupling a gear reducer to a driven machine, such as a screw conveyor. The gear reducer includes a sealing assembly disposed in a bore of the gear reducer housing about an output member, such as an output hub. An adapter element couples the gear reducer to the load, such as directly to a screw conveyor trough. A first seal assembly is disposed in the adapter about an output shaft received in the output hub of the gear reducer. For a screw conveyor application, the first seal assembly may be adjacent to the screw conveyor trough plate. The adapter includes a second seal assembly within an interface flange which is secured to the gear reducer housing. The first and second seal assemblies are spaced from one another by a dropout area defined by integral standoffs of the adapter.

23 Claims, 3 Drawing Sheets

SEALING SYSTEM FOR A SCREW CONVEYOR AND DRIVE

BACKGROUND OF THE INVENTION

1. Field of the Invention

The present invention relates generally to the field of power transmission systems, particularly systems for driving screw conveyors and similar material handling devices. More particularly, the invention relates to a technique for isolating a gear reducer used in such a drive system from contaminants, particularly those originating in the transferred materials.

2. Description of the Related Art

Various drive systems have been posed and are presently in use for powering material handling machinery, such as belt conveyors, screw conveyors, and so forth. Certain of these material handling applications present unique difficulties which must be considered in the original design of the drive system and its components. Moreover, because many of these systems require relatively high torque and low speed drives, gear reducers are commonly employed in mechanical drives to reduce the speed provided by a prime mover such as an electric motor or internal combustion engine. The application constraints must, therefore, be considered in the design and installation of the gear reducers.

Gear reducers are commonly configured with a single or multiple stages. In a single-stage gear reducer, power is input from a prime mover via an input shaft or hub. The input shaft carries a pinion or gear which intermeshes with an output gear supported on an output shaft or hub. Based upon the sizes and configurations of the input and output gearing, a speed reduction ratio is established between the input and output. Multiple-stage gear reducers include intermediate rotating assemblies which intermesh with the input and output assemblies. The overall gear reduction ratio is, then, a product of the successive reduction ratios of the series of stages.

A particular challenge in the application of gear reducers to material handling applications involves exclusion of foreign contaminants from the gear reducer housing, and containment of lubricant within the housing. Specifically, material handling applications such as screw conveyer drives necessarily involve placement of the drive machinery in what can be a difficult environment in terms of free contaminants. Because screw conveyors, in particular, may transport liquid, solid, semi-liquid, semi-solid, fine or course materials and media, an effective contaminant exclusion and sealing system must be provided to contain potentially harmful contaminants in the screw conveyor trough and prevent them from entering into the gear reducer housing. Within the housing, the gearing and bearing sets supporting the rotating assemblies are typically bathed or wetted by a lubricant, such as mineral oil. In addition to preventing the ingress of contaminants, then, it is often desirable to provide some type of sealing system to maintain the lubricant within the gear reducer housing.

Various approaches have been proposed for sealing gear reducer housings in applications such as screw conveyor drives. However, at present, no commercially available screw conveyor contaminant control system provides completely satisfactory performance. Specifically, where materials may migrate from a screw conveyor trough, or a similar conveyance component of the system, the contaminants may sometimes infiltrate into the gear reducer housing, despite external seals.

There remains a need, therefore, for an improved system for excluding contaminants from a gear reducer housing, particularly in screw conveyor drive applications and keeping them contained in the screw conveyor trough.

SUMMARY OF THE INVENTION

The invention provides an improved technique for protecting gear reducer components in material handling applications designed to respond to such needs. The system includes a series of barriers defined between the source of contaminants and the gear reducer internal components. These barriers include seals, as well as close clearances, mechanical shields, and spaces and cavities which both trap contaminants and allow contaminants to drop or be otherwise eliminated from the path between the contaminant source and the gear reducer, The technique may be applied to new drive systems, but may also be retrofitted to existing drive systems, such as during regular servicing. Moreover, in screw conveyor applications, components of the sealing and contaminant exclusion system may be integrally assembled with the gear reducer, while other components are assembled in an adapter used to couple the gear reducer drive to the screw conveyor trough. The system thus provides an effective series of barriers to contaminants which may be at least partially preassembled for easy installation.

In a presently preferred embodiment, a series of barriers are defined by the system components. First barriers are defined immediately adjacent to a screw conveyor trough, including the trough plate, and rings and seals associated with the trough plate. The rings and seals may be conveniently packaged with an adapter which serves to couple the gear reducer drive to the screw conveyor trough plate. The adapter includes an integral drop out area which permits contaminants, both liquid and solid, to be eliminated from the system. Additional seals and barriers are provided on an opposite side of the drop out area. Certain of these seal assemblies may be integral with the adapter, while others are integral with the gear reducer. Where the latter seal assemblies are provided as an original component of the gear reducer, the overall system does not require any special configuration of the gear reducer, but may be applied and defined during assembly of the overall drive system.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
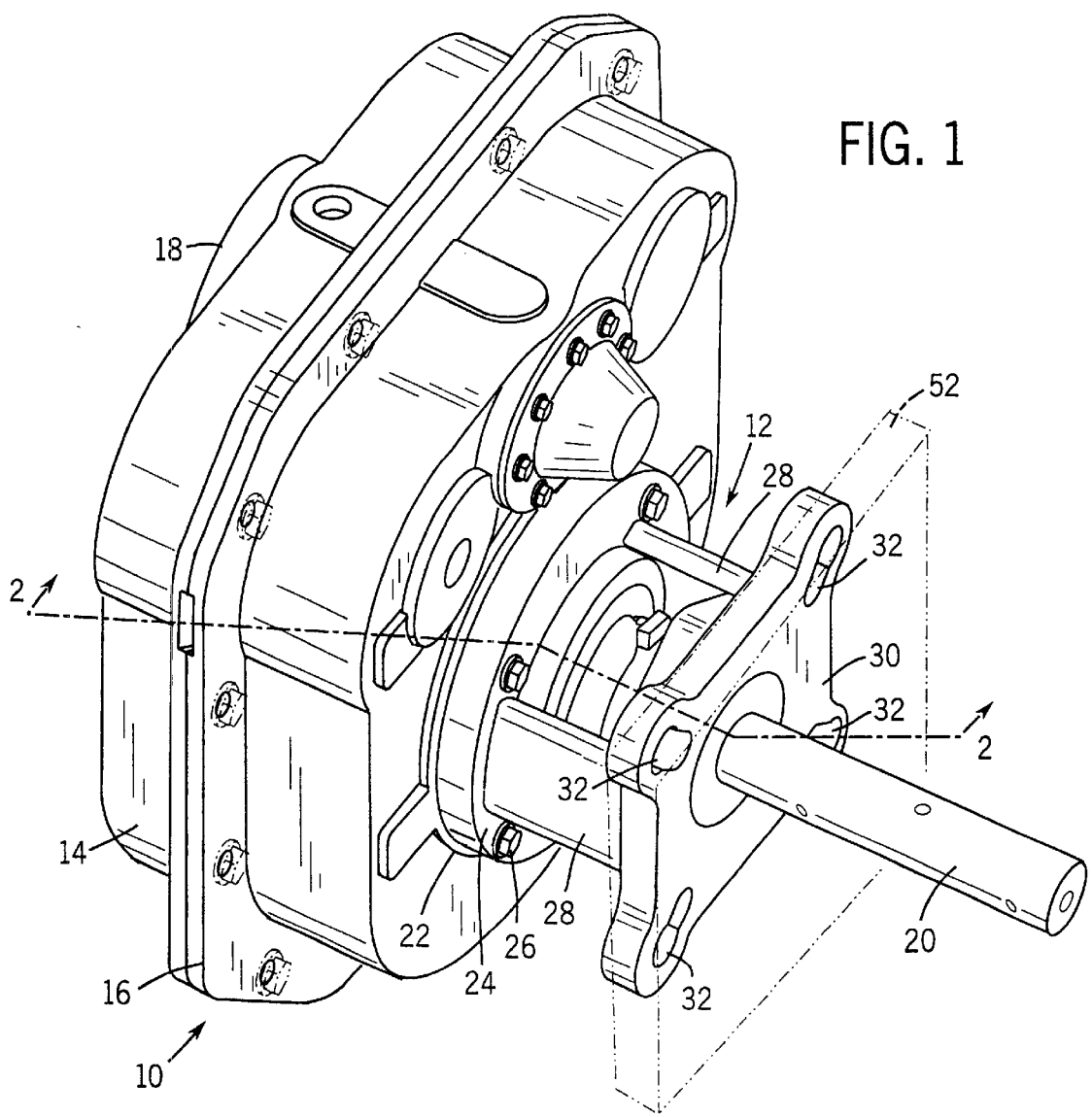
FIG. 1 is a top perspective view of an exemplary gear reducer and adapter incorporating components of the present technique for preventing contaminants from infiltrating into the gear reducer housing in a material handling application, such as a screw conveyor drive.

Turning now to the drawings, and referring first to FIG. 1, a gear reducer 10 is illustrated as coupled to an adapter assembly 12 for transmitting mechanical power to an application. As described more fully below, the configuration of gear reducer 10 and adapter 12 illustrated in the Figures, and described herein, is particularly well suited for driving a screw conveyor which, in itself, may be of generally conventional design. In general, however, the configuration of the components illustrated and described herein is not intended to be limited to any particular final application. Rather, the present techniques may be employed for driving various types of machines, while providing enhanced contaminant control, particularly against the ingress of solid and liquid contaminants into a gear reducer.

In the embodiment illustrated in FIG. 1, gear reducer 10 includes a housing 14, comprising a pair of mating shells or housing halves joined to one another by a peripheral flange 16. Housing 14 includes integral features for receiving rotational assemblies, including input and output shafts or hubs, gearing, bearing sets, and so forth, as described more fully below. In the illustrated embodiment, an input side 18 of the housing supports an input shaft which would extend from the housing and be coupled to a prime mover. The mechanical components of the input shaft, prime mover, and interface components are not illustrated in the Figures for the sake of simplicity. In general, however, any suitable input shaft and drive arrangement may be employed, such as a belt and sheave drive, in-line coupling, and so forth. In screw conveyor applications, for example, it is generally preferred to provide a prime mover, such as an electric motor commonly supported with the gear reducer and to drive an input shaft via endless belts or chains.

An output shaft 20 is coupled to gear reducer 10 through adapter 12. The gear reducer housing 14 includes an integral mechanical support 22 for receiving adapter 12 and for maintaining sealing and alignment in the final assembly. A securement flange 24 is provided on adapter 12 and interfaces with support 22 to secure the adapter and gear reducer to one another via fastener sets, including conventional bolts 26. In the illustrated configuration, adapter 12 includes a pair of arms or standoffs 28 which are formed integrally with flange 24 to define an access and dropout area for contaminants as described below. A front flange 30 is secured, preferably cast integrally with flange 24 and standoffs 28, to permit the adapter to be interfaced with the driven application, such as a screw conveyor. Slotted apertures 32 are formed in flange 30 for receiving fasteners for this purpose.

In screw conveyor applications, the gear reducer and adapter arrangement illustrated in FIG. 1 is secured to an end of the screw conveyor, with output shaft 20 being interfaced with an end of the screw conveyor auger. When driven by the prime mover, the gear reducer functions to reduce the input speed to a desired output speed, causing rotation of shaft 20 for delivery of the needed torque at the desired output speed.

Figure 2:
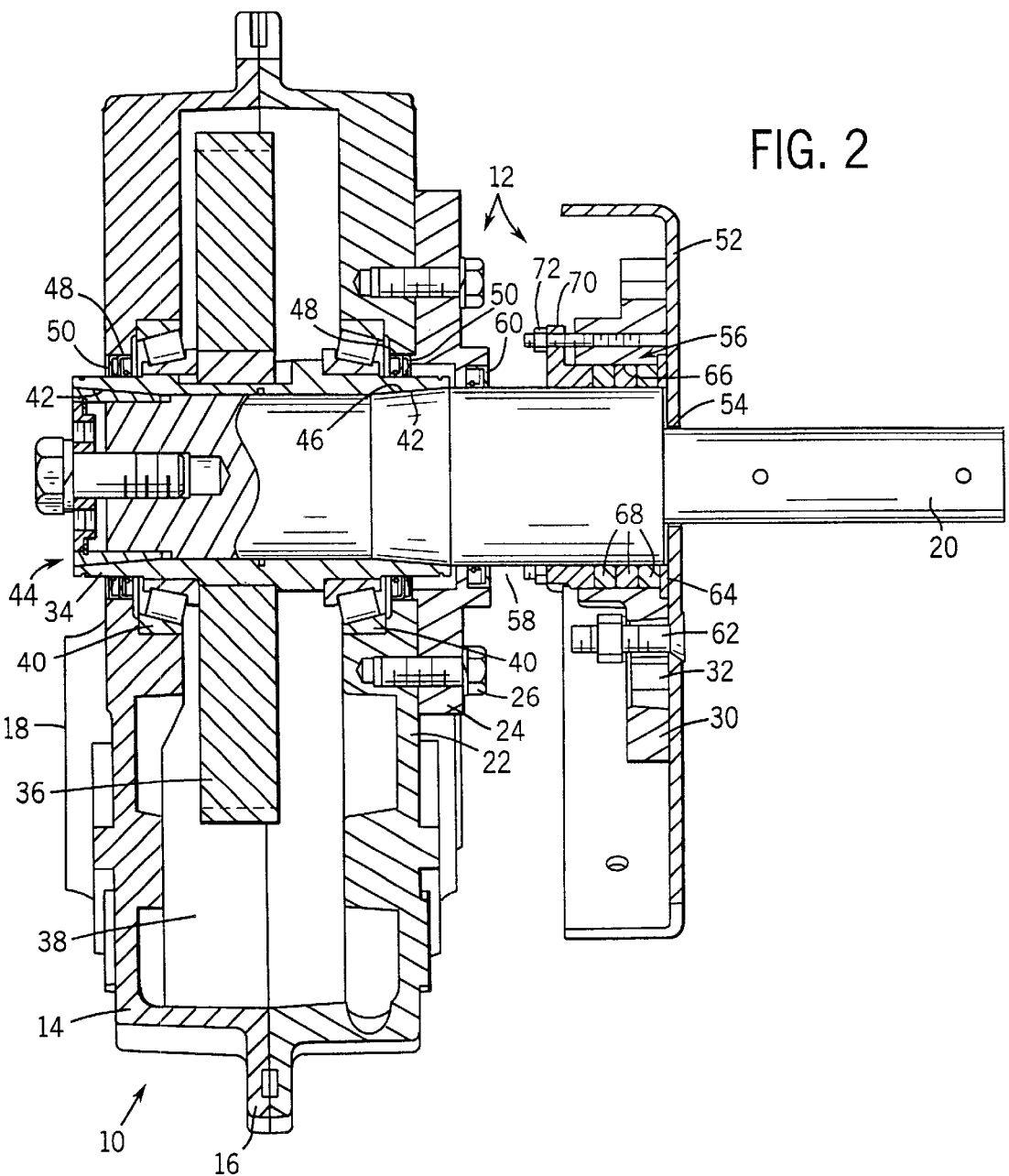
FIG. 2 is a partial sectional view of the arrangement of FIG. 1, also showing a screw conveyor or trough plate, and illustrating the various components of the system, as installed.

FIG. 2 illustrates gear reducer 10 and adapter 12 in partial section, along line 2—2 of FIG. 1. FIG. 2 also illustrates installation of the gear reducer with a trough plate of a screw conveyor, with the other components of the screw conveyor and prime mover not being shown for the sake of clarity. In the final application, the gear reducer, prime mover, and screw conveyor may be supported on a conventional machine structure with interface brackets and supports designed to hold and support the load represented both by the weight of these components and by the forces exerted by them during operation.

As shown in FIG. 2, a final stage of gear reducer 10 includes an output hub 34 coupled to output shaft 20 via a standard key (not shown). Gearing 36 is supported on hub 34 and is driven in rotation during operation of the gear reducer in a generally conventional manner. Gearing 36, and other internal components of the gear reducer, are positioned within a cavity 38, defined between the housing shell portions. Bearings 40 are provided on either side of gearing 36 to rotationally support hub 34 within housing 14. The hub and gearing assembly, then, along with shaft 20 is free to rotate when driven in operation. When installed in the application, internal cavity 38 of the gear reducer housing 14 will generally be partially filled with a lubricating medium, such as mineral oil. The lubricating medium serves both to maintain lubrication of the gearing and bearings, as well as to flush particles or debris from the gearing, and to cool and machinery during operation. The lubricant is retained within the housing and isolating from contaminants, particularly those present in the conveyor, via sealing assemblies and components described more fully below.

Features of hub 34 preferably allow it to be secured directly to output shaft 20 which, as in the illustrated embodiment, may be separable from the gear reducer. As shown in FIG. 2, hub 34 is provided with tapered portions 42 adjacent each end thereof. A tapered bushing coupling assembly 44 is positioned at one end of the hub and interfaces with the corresponding tapered portion 42 to exert radial forces between the hub and shaft to maintain a tight coupling of the shaft within the hub. Various configurations of such assemblies are in use and commercially available, such as from Rockwell Automation Power Systems of Greenville, S.C. At an opposite end of hub 34, a similar tapered portion 42 interfaces directly with a tapered shoulder 46 of shaft 20. The locking assembly 44 draws the tapered portion and shoulder into tight engagement with one another, with a generally cylindrical portion of the shaft therebetween extending freely within the hub, spaced slightly from the interior peripheral surface of the hub to avoid fretting. As will be appreciated by those skilled in the art, the tapered shoulder 46 of shaft 20 could be replaced by a tapered bushing arrangement, similar to that illustrated in assembly 44, which would lodge between the tapered portion 42 of the hub and a generally cylindrical region of the shaft.

Housing 14 includes bores or apertures 48 through which the hub extends. A seal assembly 50 is provided within the bores 48 at both ends of the hub to retain lubricant within the gear reducer, and to exclude external contaminants from the internal cavity 38 of the housing. Additional contaminant control and sealing features are provided by adapter 12. In particular, a trough plate 52 of the screw conveyor is provided with an aperture 54 which fits within close clearance around output shaft 20. A seal assembly, designated generally by reference numeral 56, is provided immediately adjacent to the trough plate. A dropout area 58 is defined by adapter 12 between seal assembly 56 and an additional outboard seal assembly 60.

Figure 3:
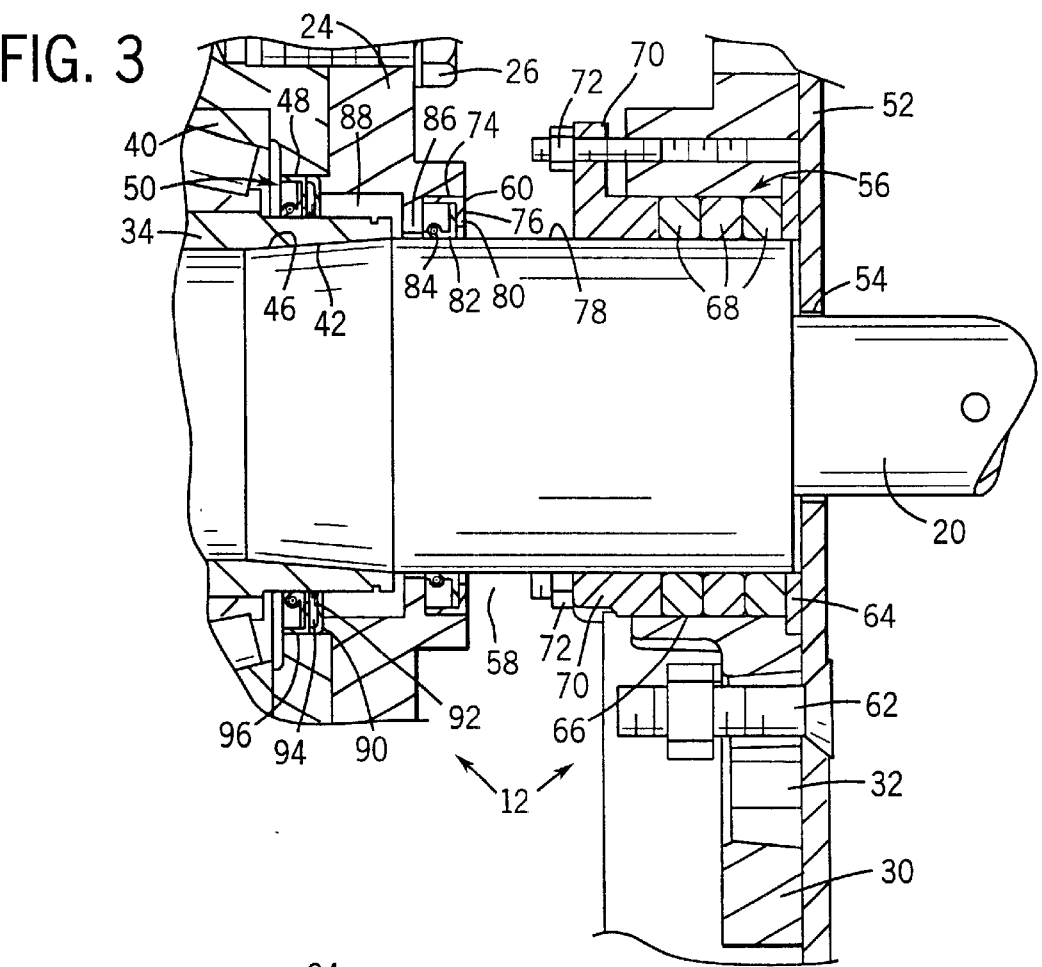
FIG. 3 is a detailed view of the contaminant elimination and sealing system shown in FIG. 2, illustrated in somewhat greater detail.

The presently preferred configuration of the foregoing components and assemblies is illustrated in somewhat greater detail in FIG. 3. As illustrated, the adapter flange 30 is designed to receive fastener sets 62 (one set shown in FIG. 3) for securing the gear reducer and adapter assembly to trough plate 52 of the screw conveyor via slotted apertures 32. At the location where output shaft 20 crosses trough plate 52, aperture 54 provides close clearance about the shaft, to prevent the intrusion of larger solid or semi-sold contaminants beyond the trough plate. Immediately adjacent to the trough plate, an annular seal ring 64 is provided which contacts a packing cavity or volume 66 of seal assembly 56.

Packing 68 is provided within the packing volume, and is tightly compressed via a backup ring 70. Backup ring 70 extends into the packing volume, as defined within an annular region of the adapter flange 30. Fastener sets 72 permit backup ring 70 to be retained within and tightly compressed against packing 68, forcing a tight seal between the packing and output shaft 20, as well as against the annular seal ring 64. Any suitable packing 68 may be employed in the embodiment illustrated in FIG. 3, such as braided packing, and the like.

Solid and liquid products within the screw conveyor (e.g. to the right of trough plate 52 in FIG. 3) will generally be prevented from migrating toward the gear reducer by close-fitting aperture 54, seal ring 64, and packing 68. For contaminants which may, nevertheless, reach the gear reducer side of the trough plate, dropout area 58 enables such contaminants to fall freely through the adapter 12 where they can be collected for disposal. Immediately adjacent to dropout area 58, adapter 12 includes a seal recess 74 which receives and supports seal assembly 60. In the illustrated embodiment, seal assembly 60 includes a double lip seal 76 which fits closely about and contacts an outer surface 78 of output shaft 20. In particular, seal 76 includes a seal support and shield 80 configured as an annular metallic ring, to which an elastomeric sealing element 82 is bonded. Support 80 fits within close clearance about the surface 78 of the output shaft, while sealing element 82 provides at least one, and preferably two, points of contact about the shaft. A biasing element 84, such as an annular spring, is preferably embedded within the sealing element to bias the sealing element into tight engagement about the output shaft.

Immediately adjacent to seal assembly 60, adapter 12 forms a physical barrier 86 which serves as an abutment for the seal assembly, and which, again, provides close clearance about outer surface 78 of the shaft. The adapter terminates in a region, designated generally by reference numeral 88 in the Figures, which when adapter 12 is mounted on the gear reducer housing, defines an internal cavity as a further barrier to contaminants.

The overall sealing system provided by the present technique preferably further includes additional sealing assemblies which may be supported by the adapter 12, or, as in the preferred embodiment illustrated, are supported by the gear reducer itself. As shown in FIG. 3, this additional sealing assembly, designated generally by reference numeral 50, includes a protective outboard seal assembly, and an additional inboard seal assembly. The outboard seal assembly comprises a shield 90, made of a metallic ring, which fits within and is retained within the bore 48 in the gear reducer housing, through which hub 34 extends. The shield has an elastomeric sealing element 92 bonded thereto, which rides against an outer surface of the hub. The inboard seal, fitted immediately adjacent to the shield 90, defines a gap 94 therebetween, for additional contaminant control. The inboard seal includes a double lip seal 96, which may be generally similar to seal 60 described above, providing one, and preferably two, biased contact points which ride against hub 34 as the hub is rotated in operation.

In the arrangement described above, contaminants which are present on output shaft 20 outboard of seal assembly 60 are precluded from migrating into the gear reducer by the components of seal assembly 60, including the close clearance of the shield support about the shaft, and the elastomeric seal riding against the output shaft. The contaminants are further precluded for entry by barrier 86, and cavity 88 immediately adjacent to the barrier. Finally, any contaminants which may migrate into cavity 88 are excluded from entry into the gear reducer itself via the components of seal assembly 50. It should be noted that seal assembly 50 also precludes the egress of lubricants from within the housing to the environment. Moreover, the seals of assembly 50 are wetted by the lubricant, to provide an additional contaminant barrier.

In the embodiment illustrated in the Figures, seal assembly 50 is recessed slightly within bore 48, to accommodate flange 24, which may include a pilot surface for maintaining proper alignment of the adapter and gear reducer housing. Where desired, the seal assembly may be provided flush with the outer surface of the gear reducer housing, however, as illustrated on the left side of the gear reducer in FIG. 2.

The foregoing structure is subject to various adaptations and modifications, depending upon the particular application, and the application needs. For example, the particular elastomeric and metallic materials employed in the seals themselves may be selected in accordance with the types of contaminants likely to be encountered in the application. Moreover, alternative seal configurations may be employed as illustrated in FIG. 4.

Figure 4:
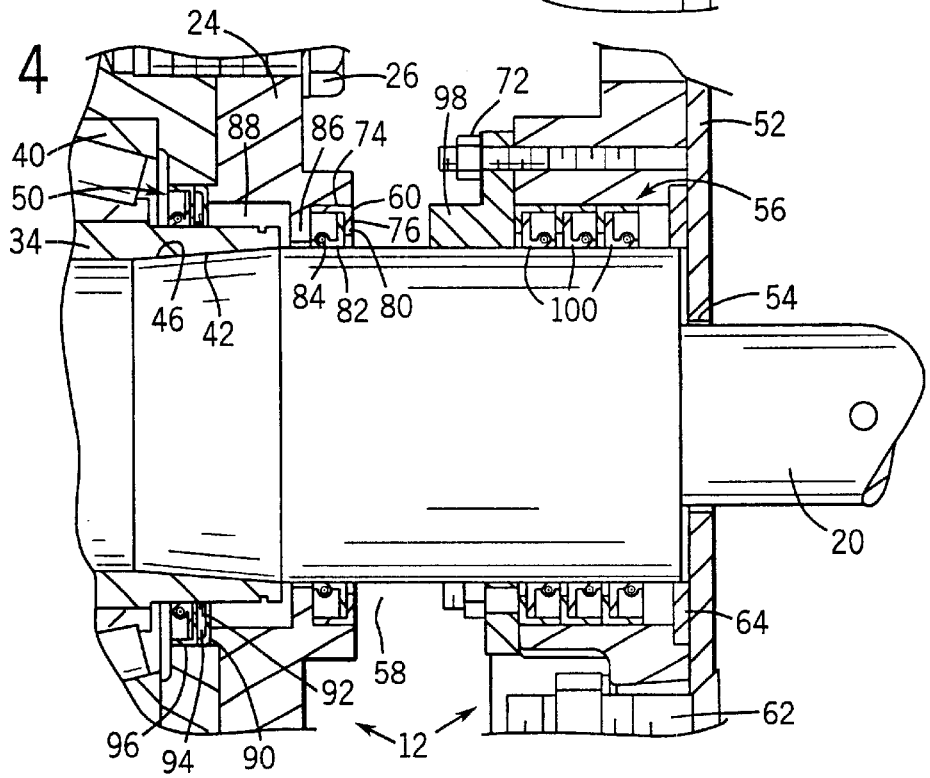
FIG. 4 is a view similar to that of FIG. 3, illustrating an exemplary alternative embodiment of the system.

By way of example, as shown in FIG. 4, the braided packing-type seal provided within seal assembly 56 may be replaced with alternative sealing components 100. In the alternative shown, backup ring 70 is replaced with an alternative backup ring 98, and the packing within the volume 66 is replaced with lip-type seals. Backup ring 98 may be the same part as backup ring 70 reversed. In such arrangements, backup ring 98 generally need not compress the seals within the assembly, but serves as a barrier enclosing the sealing volume and retains the seals in place between the flange 30 and the output shaft 20.

These and other alternative forms of the present technique may be adapted by those skilled in the art, and specific embodiments have been shown and described herein by way of example only. It should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A sealing system for a gear reducer output shaft, the system comprising:

first seal assembly disposed along the output shaft spaced from the gear reducer and contacting the output shaft to preclude migration of contaminants therealong;

a second seal assembly disposed along the output shaft within an interface member adjacent to the gear reducer, the second seal assembly being spaced from the first seal assembly by a dropout area, the second seal assembly contacting the output shaft to preclude migration of contaminants toward the gear reducer and promote dropout of contaminants through the dropout area; and a third seal assembly disposed intermediate the interface member and an internal region of the gear reducer, the third seal assembly precluding ingress of contaminants into the gear reducer.

2. The sealing system of claim 1, wherein the third seal assembly contacts an output hub of the gear reducer.

3. The sealing system of claim 1, wherein the first and second seal assemblies are provided in an adapter secured to the gear reducer adjacent to the third seal assembly.

4. The sealing system of claim 3, wherein the third seal assembly is resident within the gear reducer, and the first and second seal assemblies are removable from the gear reducer with the adapter.

5. The sealing system of claim 1, wherein the first seal assembly includes a seal volume defined in an interface flange secured to the gear reducer, and wherein at least one sealing member is dispose within the sealing volume.

6. The sealing system of claim 5, wherein the first seal assembly includes a seal ring providing an outboard barrier to contaminants.

7. The sealing system of claim 5, wherein the first seal assembly includes a backup member for retaining the at least one sealing member within the sealing volume.

8. The sealing system of claim 7, wherein the backup member compresses the at least one sealing member within the sealing volume.

9. The sealing system for a gear reducer output shaft, the system comprising:
   a gear reducer seal assembly disposed within a bore of a gear reducer housing about an rotating output member for isolating an internal region of the gear reducer; and
   a sealing adapter fitted to the gear reducer adjacent to the gear reducer seal assembly, the sealing adapter including a first seal assembly disposed along the output shaft spaced from the gear reducer and contacting the output shaft to preclude migration of contaminants therealong, and a second seal assembly disposed along the output shaft within an interface member adjacent to the gear reducer, the second seal assembly being spaced from the first seal assembly by a dropout area, the second seal assembly contacting the output shaft to preclude migration of contaminants toward the gear reducer and promote dropout of contaminants through the dropout area.

10. The sealing system of claim 9, wherein the gear reducer seal assembly contacts an output hub of the gear reducer, the output shaft being fitted within the output hub.

11. The sealing system of claim 9, wherein the gear reducer seal assembly is a compound assembly including an outboard shielding seal and an inboard lip seal.

12. The sealing system of claim 9, wherein the first seal assembly includes a seal volume defined in an interface flange of the adapter, and wherein at least one sealing member is dispose within the sealing volume.

13. The sealing system of claim 12, wherein the first seal assembly includes a seal ring providing an outboard barrier to contaminants.

14. The sealing system of claim 12, wherein the first seal assembly includes a backup member for retaining the at least one sealing member within the sealing volume.

15. The sealing system of claim 14, wherein the backup member compresses the at least one sealing member within the sealing volume.

16. A system for sealingly coupling a gear reducer drive to a screw conveyor, the system comprising:
   a gear reducer having a housing, a bore formed in the housing and a rotatable output hub extending through the bore;
   a gear reducer seal assembly disposed within the bore about the hub for isolating an internal region of the gear reducer; and
   a sealing adapter configured to mate with the gear reducer about the output hub, to interface with a screw conveyor, and to receive an output shaft therethrough, the sealing adapter including a first seal assembly disposed along the output shaft spaced from the gear reducer and contacting the output shaft to preclude migration of contaminants therealong, and a second seal assembly disposed along the output shaft within an interface member adjacent to the gear reducer, the second seal assembly being spaced from the first seal assembly by a dropout area, the second seal assembly contacting the output shaft to preclude migration of contaminants toward the gear reducer and promote dropout of contaminants through the dropout area,
   wherein the gear reducer seal assembly is disposed intermediate the sealing adapter and the internal region of the gear reducer.

17. The system of claim 16, wherein the interface member includes a flange securable to the gear reducer housing about the output hub.

18. The system of claim 16, wherein the adapter includes an integrally formed body including the interface member, a housing for the first seal assembly, and standoffs extending therebetween and defining the dropout area.

19. The system of claim 16, wherein the gear reducer seal assembly is a compound assembly including an outboard shielding seal and an inboard lip seal.

20. The system of claim 16, wherein the first seal assembly includes a seal volume defined in an interface flange of the adapter, and wherein at least one sealing member is dispose within the sealing volume.

21. The system of claim 20, wherein the first seal assembly includes a seal ring providing an outboard barrier to contaminants.

22. The system of claim 20, wherein the first seal assembly includes a backup member for retaining the at least one sealing member within the sealing volume.

23. The system of claim 22, wherein the backup member compresses the at least one sealing member within the sealing volume.

* * * * *